3,082,081
SELECTIVE SEPARATION OF LUTEO COBALT FROM AMMONIACAL SOLUTIONS CONTAINING DIVALENT COPPER AND/OR DIVALENT NICKEL BY PREFERENTIAL ADSORPTION ON A CHELATING RESIN
Joseph H. Howe, Freeland, and Leo R. Morris, Midland, Mich., assignors to The Dow Chemical Company, Midland, Mich., a corporation of Delaware
Filed May 19, 1960, Ser. No. 30,107
3 Claims. (Cl. 75—119)

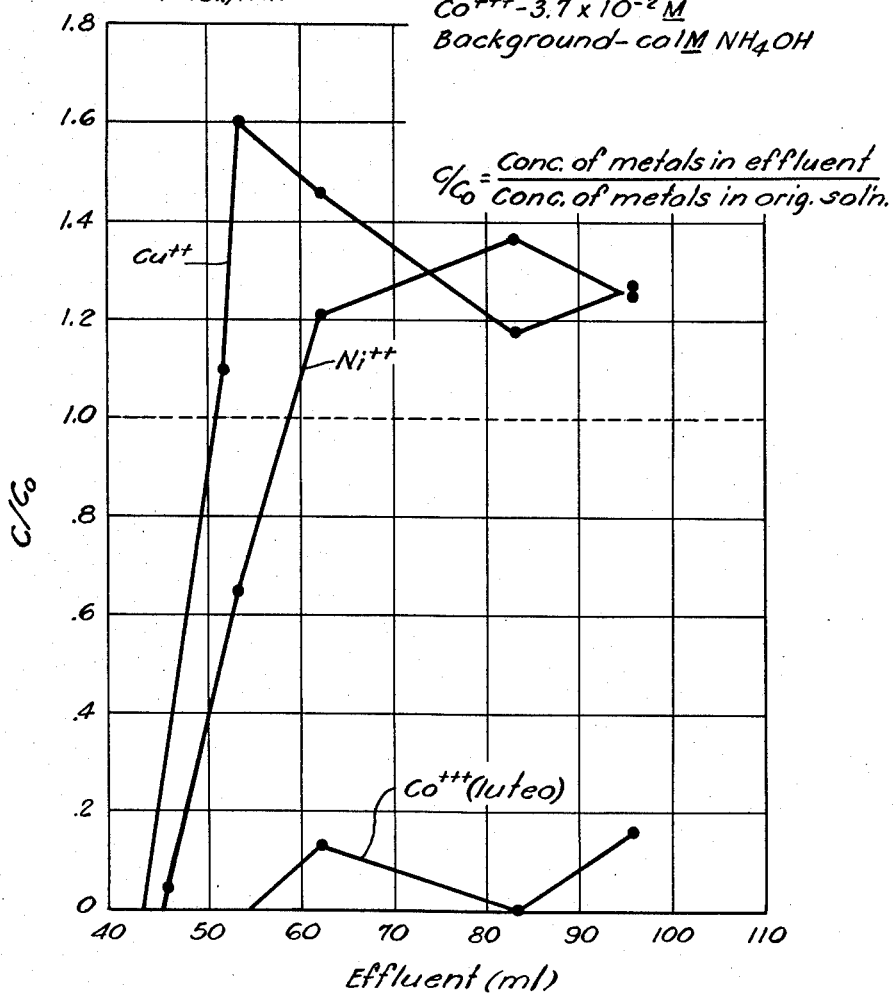

This invention concerns a method for separating cobalt from copper or nickel or from copper and nickel. More particularly, it concerns a method for separating cobalt from copper and/or nickel in an ammoniacal medium wherein the cobalt is in the luteo form by adsorption on a chelating resin wherein the cobalt is preferentially adsorbed by the chelating resin and the copper and/or nickel are thereby readily separated from the cobalt. More particularly, the method of this invention consists in separating cobalt from copper and/or nickel by adsorption on a chelating resin in the ammonium salt form having carboxymethylthio, —S—CH$_2$CO$_2$H, or 1,2-dicarboxyethylthio, —S—CH(CH$_2$CO$_2$H)CO$_2$H, substituent groups wherein cobalt is preferentially held and thereafter eluting and simultaneously regenerating the loaded resin with a mineral acid wash to recover a cobalt concentrate.

In the past use of ion exchange and chelating resins, various procedures have been developed for concentrating metals as their conventional or complex ions. In the process of this invention, a separation has been developed wherein the order of selectivitiy for cobalt, copper and nickel has been reversed from that of previously known procedures wherein either copper or nickel is bound by the separating means in preference to cobalt. This newly discovered preferential adsorption of cobalt is quite advantageous in the metals separation of ore leach liquors containing binary or ternary luteo cobalt mixtures of the above metals where it is desired to hang up or concentrate the cobalt, particularly when the cobalt is present in small amounts relative to copper and/or nickel. The use of such a cobalt selective resin lowers the frequency of regeneration when a low-cobalt ore leach liquor is to be processed and thereby reduces operating costs.

The process of this invention employs a chelating resin of the groups of resinous polymeric (vinylbenzylthio) acetic acid, prototype poly(—CH$_2$—CH—C$_6$H$_4$—CH$_2$—S—CH$_2$CO$_2$H)

and polymeric (vinylbenzylthio)succinic acid, prototype poly[—CH$_2$—CH—C$_6$H$_4$—CH$_2$—S—CH(CH$_2$CO$_2$H)CO$_2$H]

crosslinked with about 1–8 mole percent, total polymer basis, of a conventional crosslinking agent such as divinylbenzene, divinyltoluenes, divinylnaphthalenes, divinyl ethyl benzenes, divinylxylenes, diacrylate esters, dimethacrylate esters, diallyl esters and the like. The aryl nucleus can also be substituted with non-reactive substituent groups, e.g., lower alkyl up to 3 carbon atoms and halogen. These resins will be referred to hereafter as (thio) acetic and (thio)succinic chelating resins. They are used in the ammonium salt form.

In practice, an ammoniacal solution containing a mineral acid salt of luteo cobalt, divalent copper and/or divalent nickel is contacted at room temperature with a (thio)acetic or a (thio)succinic chelating resin in the ammonium salt form. The ammonium salt forms of these resins can be preformed, advantageously by equilibration with ammonium hydroxide, or can be formed in situ by passing through the ammoniacal metals solution. Either a batch type or a column operation can be used. In either case, contact time is varied as desired for a wanted separation. In either case, a simple test run suffices to determine the contact time of a metals solution with a given chelating resin. The preferentially adsorbed cobalt, together with a minor amount of copper and/or nickel, is thereafter removed with a dilute mineral acid eluant advantageously 1-molar hydrochloric acid. The preference of the given chelating resins is shown when a calculation is made of the metal preference ratio, hereafter M.P.R. The M.P.R. is the ratio of the molar concentrations of the metals in the resin eluate corrected for the molar concentration in the original metal liquor, i.e., $$M.P.R. = \frac{(A_e)(B_o)}{(B_e)(A_o)}$$

where $(A_e)$ = molar concentration of metal A in resin eluate
$(B_e)$ = molar concentration of metal B in resin eluate
$(A_o)$ = molar concentration of metal A in original metal liquor, and
$(B_o)$ = molar concentration of metal B in original metal liquor The M.P.R.'s for a ternary system can be derived by combining the M.P.R.'s calculated for any two pairs of the three metals in the system. With batch (equilibrium) operation, the M.P.R.'s of Co:Ni:Cu approximate 5:1:: with a (thio)acetic chelating resin crosslinked with 1 weight percent divinylbenzene and approximate 20:3:: wih a (thio)succinic chelating resin crosslinked with weight percent divinylbenzene. With column operation the M.P.R.'s of Co:Ni:Cu approximate 12:1:1 both for (thio)acetic and a (thio)succinic chelating resin which are 4 percent crosslinked with divinylbenzene.

The (thio)acetic and (thio)succinic chelating resins may be prepared by reacting a water-wet poly(vinylaryl sulfonium) anion exchange resin, as described in U.S. Patent 2,895,925 and in U.S. patent application Serial No. 769,545, filed October 27, 1958, with a stoichiometric equivalent of disodium thioglycollate or of trisodium mercaptosuccinate, respectively, by heating the reactants on a steam bath for a time sufficient to displace sulfide with carboxymethylthio or with 1,2-dicarboxyethylthio groups respectively. This generally takes from 1 to 2 days. The resulting (thio)acetic or (thio)succinic chelating resin usually in the sodium salt form, is separated from the reaction medium, rinsed with water and with concentrated hydrochloric acid and given a final water rinse. Before use, the resin is changed to the ammonium salt form.

The following non-limitative examples describe completely specific embodiments of the inventive process and set forth the best mode contemplated by the inventors of carrying out their invention.

EXAMPLE 1

A small quantity (1.6 g.) of a (thio)acetic chelating resin, 2 percent crosslinked with divinylbenzene, prepared as described above, was equilibrated in ca. 1-molar NH$_4$OH for an hour. The NH$_4$OH was decanted and the resin was contacted with an ammoniacal metal liquor of the following composition:

|  | M |
|---|---|
| CuSO$_4$·5H$_2$O | 0.03 |
| NiSO$_4$·6H$_2$O | 0.03 |
| [Co(NH$_3$)$_6$]$_2$(SO$_4$)$_3$ | 0.05 | in an aqueous solution of 1-molar NH$_4$OH.

After 24 hours of solution-resin contact with constant agitation, the excess metal solution was poured off and the resin was washed several times with 1-molar NH$_4$OH followed by several water washes. There was no observable removal of metals by these washes. The resin was eluted with 1-molar hydrochloric acid and the eluate was analyzed polarographically.

EXAMPLE 2

The procedure of Example 1 was repeated with a (thio)succinic chelating resin, 4 percent crosslinked with divinylbenzene, prepared as described above.

Following Table I gives results of the evaluations of Examples 1 and 2.

*Table I*

EQUILIBRIUM RESIN EVALUATION FOR SEPARATION OF AMMONIACAL $Cu^{++}$—$Ni^{++}$—$C^{+++}$ (LUTEO)

| Resin | Dry weight (g.) | Resin vol.[1] (ml.) | Metal preference ratio | | | Capacity | |
|---|---|---|---|---|---|---|---|
| | | | $Cu^{++}$ | $Ni^{++}$ | $Co^{+++}$ | Mmole./g. | Mmole./ml. |
| Poly[(vinylbenzylthio)acetic acid] X2[2] | 1.6 | 5.4 | 1.2 | 1 | 5.3 | 1.2 | 0.4 |
| Poly[(vinylbenzylthio)succinic acid] X4 | 0.5 | 1.8 | 1 | 2.6 | 20.1 | 3.0 | 0.9 |

[1] Equilibrated in ca. 1-molar $NH_4OH$.
[2] X=crosslinked, number=percent combined divinylbenzene.

EXAMPLE 3

The procedures of Examples 1 and 2 were repeated with similar resins but with one-hour contact time and with an approximately equimolar $Ni^{++}$—$Co^{+++}$(luteo) liquor. Results are given in following Table II.

*Table II*

PARTIAL EQUILIBRIUM RESIN EVALUATIONS FOR SEPARATION OF AMMONIACAL $Co^{+++}$(LUTEO)—$Ni^{++}$

| Resin | Luteo $Co^{+++}$—$Ni^{++}$ [1] | |
|---|---|---|
| | $Co^{+++}/Ni^{++}$ pref. ratio | Capacity, Mmole./g. |
| (Thio)succinic acid X1 [2] | 12.4 | 1.4 |
| (Thio)acetic acid X1 | 13.4 | 0.6 |

[1] One-hour equilibrium test with approximately equimolar $Co(NH_3)_6^{+++}$—$Ni^{++}$.
[2] X1=crosslinked with one mole percent divinylbenzene.

EXAMPLE 4

The (thio)succinic acid resin referred to in Example 2 was evaluated for a column separation of the $$Cu^{++}-Ni^{++}-Co^{+++}(luteo)$$

system. The liquor was similar to that described in Example 1 with the exceptions of a slight variation in the metal concentrations and the presence of 0.25 molar $(NH_4)_2SO_4$. The resin (13 ml.) was equilibrated with 1-molar $NH_4OH$ in a column (¼ inch diameter). Then a total of 150 ml. of the metal liquor was passed down through the resin column at a flow rate varying between 0.1–.2 ml./min. During the loading cycle a sharp color separation was observed on the resin, a yellow color above and a blue-green color below. After 43 ml. of clear effluent was collected, frequent cuts of the effluent were made and analyzed polarographically. The figure graphically illustrates this separation and shows the preference of the resin for luteo cobalt. The column was then washed with very dilute ammonium hydroxide and water until the effluent was clear, after which the resin column was eluted with 1-normal hydrochloric acid and the eluate was analyzed.

EXAMPLE 5

The procedure of Example 4 was repeated with a (thio)acetic chelating resin.

The analyses of the eluates of Examples 4 and 5 are given in following Table III.

*Table III*

COLUMN RESIN EVALUATION FOR SEPARATION OF AMMONIACAL $Cu^{++}$—$Ni^{++}$—$Co^{+++}$ (LUTEO)

| Resin | Dry weight (g.) | Resin vol.[1] (ml.) | Metal preference ratio | | | Capacity | |
|---|---|---|---|---|---|---|---|
| | | | $Cu^{++}$ | $Ni^{++}$ | $Co^{+++}$ | Mmole./g. | Mmole./ml. |
| Poly[(vinylbenzylthio)acetic acid] X4[2] | 3.5 | 11.0 | 1 | 1.2 | 11.6 | 1.5 | 0.5 |
| Poly[(vinylbenzylthio)succinic acid] X4 | 3.8 | 11.3 | 1 | 1.3 | 11.1 | 1.9 | 0.6 |

[1] Equilibrated in ca. 1-molar $NH_4OH$.
[2] X=crosslinked, number=percent combined divinylbenzene.

In these examples only enough metal solution was contacted with the resin to indicate a separation of the $Co^{+++}$(luteo) from the $Cu^{++}$ and $Ni^{++}$, and, therefore, the resin was only partially equilibrated. Flow rates varied from 0.1–0.3 gal./ft.$^2$/min.

What is claimed is:

1. Method for separating luteo cobalt from copper and nickel by contacting an ammoniacal solution of luteo cobalt also containing at least one member of the group consisting of divalent copper and divalent nickel with a chelating resin of the group consisting of resinous polymeric (vinylbenzylthio)acetic acid and resinous polymeric (vinylbenzylthio)succinic acid, crosslinked with about 1 to 8 mole percent, total polymer basis, of a crosslinking agent whereby the luteo cobalt is preferentially adsorbed and the cobalt is concentrated on the resin and eluting the loaded resin with a mineral acid to remove a concentrated cobalt fraction from the resin.

2. The method of claim 1 wherein the loaded resin is eluted with one-molar hydrochloric acid.

3. Method for separating luteo cobalt from copper and nickel by passing an ammoniacal solution of luteo cobalt also containing at least one member of the group consisting of divalent copper and divalent nickel through a column of an ammonium hydroxide-equilibrated chelating resin of the group consisting of resinous polymeric (vinylbenzylthio)acetic acid and resinous polymeric (vinylbenzylthio)succinic acid, crosslinked with about 1 to 8 mole percent, total polymer basis, of a crosslinking agent whereby the luteo cobalt is preferentially adsorbed and the cobalt is concentrated on the resin and eluting the loaded resin with a mineral acid to remove the cobalt as a concentrate and simultaneously to regenerate the resin.

References Cited in the file of this patent

UNITED STATES PATENTS 2,848,322    Conn et al. _____ Aug. 19, 1958
2,954,276    Hazen _____ Sept. 27, 1960

OTHER REFERENCES

Hale: Research paper, vol. 9, 1956, pages 104–108 (entitled Chelating Resins), published by Chemical Research Laboratory, Teddington, England, Ion Exchange Digest Gregor et al.: Industrial and Engineering Chemistry vol. 44, No. 12, 1952, pages 2834–2838 (entitled Chelate Ion Exchange Resin), Ion Exchange Digest.